United States Patent [19]

Dauvergne

[11] Patent Number: 5,361,593
[45] Date of Patent: Nov. 8, 1994

[54] METHOD AND APPARATUS FOR REDUCING THE TEMPERATURE OF AIR IN THE CABIN OF A STATIONARY VEHICLE

[75] Inventor: Jean Dauvergne, Fosses, France

[73] Assignee: Valeo Thermique Habitacle, Le Mesnil-Saint-Denis, France

[21] Appl. No.: 54,891

[22] Filed: Apr. 28, 1993

[30] Foreign Application Priority Data

Apr. 28, 1992 [FR] France ................ 92 05243

[51] Int. Cl.$^5$ .............. F25D 17/00; F25B 29/00
[52] U.S. Cl. .................................... 62/89; 62/133; 62/180; 165/16; 454/75
[58] Field of Search ............. 62/180, 89, 322, 133; 165/16, 411; 454/75

[56] References Cited

U.S. PATENT DOCUMENTS

| 4,776,179 | 10/1988 | Ta ........................ 62/176.6 |
| 4,941,326 | 7/1990 | Sumi et al. .................. 165/16 X |

FOREIGN PATENT DOCUMENTS

| 0118550 | 9/1980 | Japan ..................... 62/228.4 |
| 57-022909 | 5/1982 | Japan ..................... B60H 3/00 |
| 0167814 | 10/1982 | Japan ..................... 62/180 |
| 57-167814 | 1/1983 | Japan ..................... B60H 3/00 |
| 60-078813 | 9/1985 | Japan ..................... B60H 1/00 |
| 61-200022 | 1/1987 | Japan ..................... B60H 1/32 |

Primary Examiner—William E. Wayner
Attorney, Agent, or Firm—Morgan & Finnegan

[57] ABSTRACT

A vehicle has a cabin and an air conditioning system for cabin air, the system including a ventilator and a compressor. With a view to energy consumption and the time taken for reducing the cabin air temperature to an acceptable value when the vehicle has been left stationary in full sun, the air conditioning system is used for reducing cabin air temperature in three successive stages. These stages are controlled in response to the internal temperature $T_i$ and the external temperature $T_e$, as follows:

(a) when $T_i$ is much greater than $T_e$, for example due to heating by the sun, the air in the cabin is renewed by direct admission of external air to the cabin at a high flow rate;
(b) when $T_i$ is close to $T_e$, the air conditioning unit is started on a high power setting, using recycled air, so as to bring the cabin temperature rapidly down to a value approaching the required value;
(c) once the required cabin temperature is reached, the air flow rate and the working speed of the compressor are both reduced to normal levels, remaining in a recycling mode.

7 Claims, 2 Drawing Sheets

METHOD AND APPARATUS FOR REDUCING THE TEMPERATURE OF AIR IN THE CABIN OF A STATIONARY VEHICLE

FIELD OF THE INVENTION

This invention relates to a method and apparatus for reducing the temperature of the air in the cabin of a vehicle which is not travelling, that is to say when the vehicle is stationary.

BACKGROUND OF THE INVENTION

When a vehicle is left unoccupied with the windows closed, with the sun shining on it in hot weather, the temperature of air inside the cabin of the vehicle can rise to a value which is substantially greater than the external temperature. For example, when the outside temperature is 45° C., the temperature in the cabin of the vehicle can reach 65° C. It is therefore desirable to reduce the internal temperature before the driver and/or other occupants return to the vehicle.

The direct use for this purpose of an air conditioning apparatus in its normal mode of operation involves considerable expenditure for energy, and quite a long time delay before conditions are restored to a comfortable temperature, that is to say a temperature of the order of 20° C.

DISCUSSION OF THE INVENTION

An object of the invention is to provide a way of reducing the internal temperature, using an air conditioning apparatus but reducing the amount of energy that needs to be used for this purpose, and the time taken to restore comfortable conditions.

According to the invention in a first aspect, in a method of reducing the temperature of the air in the cabin of a stationary vehicle, by means of an air conditioning apparatus comprising a compressor for refrigerant fluid, a fan for delivering a stream of air into the cabin, and an evaporator for transferring heat from the said stream of air to the said refrigerant fluid, wherein the method includes detecting the temperature of the air in the cabin (or internal temperature), and the temperature of the air outside the cabin (or external temperature), and controlling the apparatus successively in three operating modes (a), (b) and (c) as a function of the detected values of temperature, as follows:

(a) the fan is so driven as to deliver into the cabin air drawn from outside when the internal temperature exceeds the external temperature by at least a predetermined limiting amount;

(b) the compressor is driven is a first regime when the conditions for operating mode (a) are not present, but the internal temperature is greater than a predetermined threshold value; and (c) the compressor is driven in a second regime such that the energy consumed and the heat exchange capacity of the evaporator are smaller than in the said first regime, but the conditions for operating modes (a) and (b) are not present.

Operating mode (a) enables the internal temperature to be reduced in practice to the same level as the external temperature by simple renewal of the air in the cabin, without using the compressor at all. For this reason the energy which has to be used is substantially reduced. If the temperature that prevails after this is still higher than the desired final temperature, operating mode (b) enables the internal temperature to be rapidly reduced still further towards this required final value.

The said first and second regimes of the compressor may, for example, be defined in terms of instantaneous speeds of rotation or by cyclic ratios involving different running periods in intermittent operation: thus for example in step (b) the compressor speed may be higher than that in step (c), or the compressor may be arranged to operate intermittently, with a longer working cycle in step (b) than in step (c).

Operating mode (c) preferably corresponds to normal operation of the air conditioning apparatus when the vehicle is travelling.

According to the invention in a second aspect, apparatus for performing the method in accordance with the said first aspect of the invention comprises an air conditioning apparatus having a compressor for refrigerant fluid, a fan, an evaporator, an internal temperature sensor, an external temperature sensor, and control means for controlling the fan and the compressor as a function of signals supplied by the said sensors, whereby to perform the said operating modes (a), (b) and (c).

According to a preferred feature of the invention, in operating mode (a), all of the air delivered into the cabin is external air, and in at least one of the operating modes (b) and (c), at least some of the air delivered into the cabin is recirculated air.

Preferably, operation of the apparatus is interrupted when the vehicle is still stationary after a predetermined period of time.

According to a further preferred feature of the invention, the fan is driven at a first speed in operating modes (a) and (b), and at a second speed, slower than the said first speed, in operating mode (c).

The said predetermined limiting amount is preferably about 3° C., and the said predetermined threshold value is preferably about 25° C.

According to another preferred feature of the invention, the apparatus includes at least one recirculating valve, which is adapted to be displaced by the control means in such a way as to deliver into the cabin either external air exclusively, or air which at least partly comprises recirculated air.

Preferably, the apparatus includes timing means adapted to interrupt the operation of the air conditioning apparatus automatically at the end of a predetermined time after the apparatus has been started.

According to yet another preferred feature of the invention, the apparatus includes programming means adapted to start the operation of the air conditioning apparatus at a preselected time.

Preferably, the apparatus includes remote control means adapted to start the operation of the air conditioning apparatus from a distance.

According to still another preferred feature of the invention, the apparatus includes a motor supplied with a low voltage for driving the fan, together with a motor supplied with a high voltage for driving the compressor.

The terms "low voltage" or "low tension", as used herein, mean a voltage of around 10 volts, and typically 12 volts; and the terms "high voltage" and "high tension" mean a voltage of several tens of volts, typically about 50 or 120 volts.

The apparatus is particularly suitable for installation in an electrically propelled vehicle with the motor which drives the compressor being supplied with power by the traction battery of the vehicle.

Further features and advantages of the invention will appear more clearly on a reading of the description of a preferred embodiment of the invention which follows, and which is given by way of example only and with reference to the accompanying drawings.

DESCRIPTION OF A PREFERRED EMBODIMENT OF THE INVENTION

Figure 1:
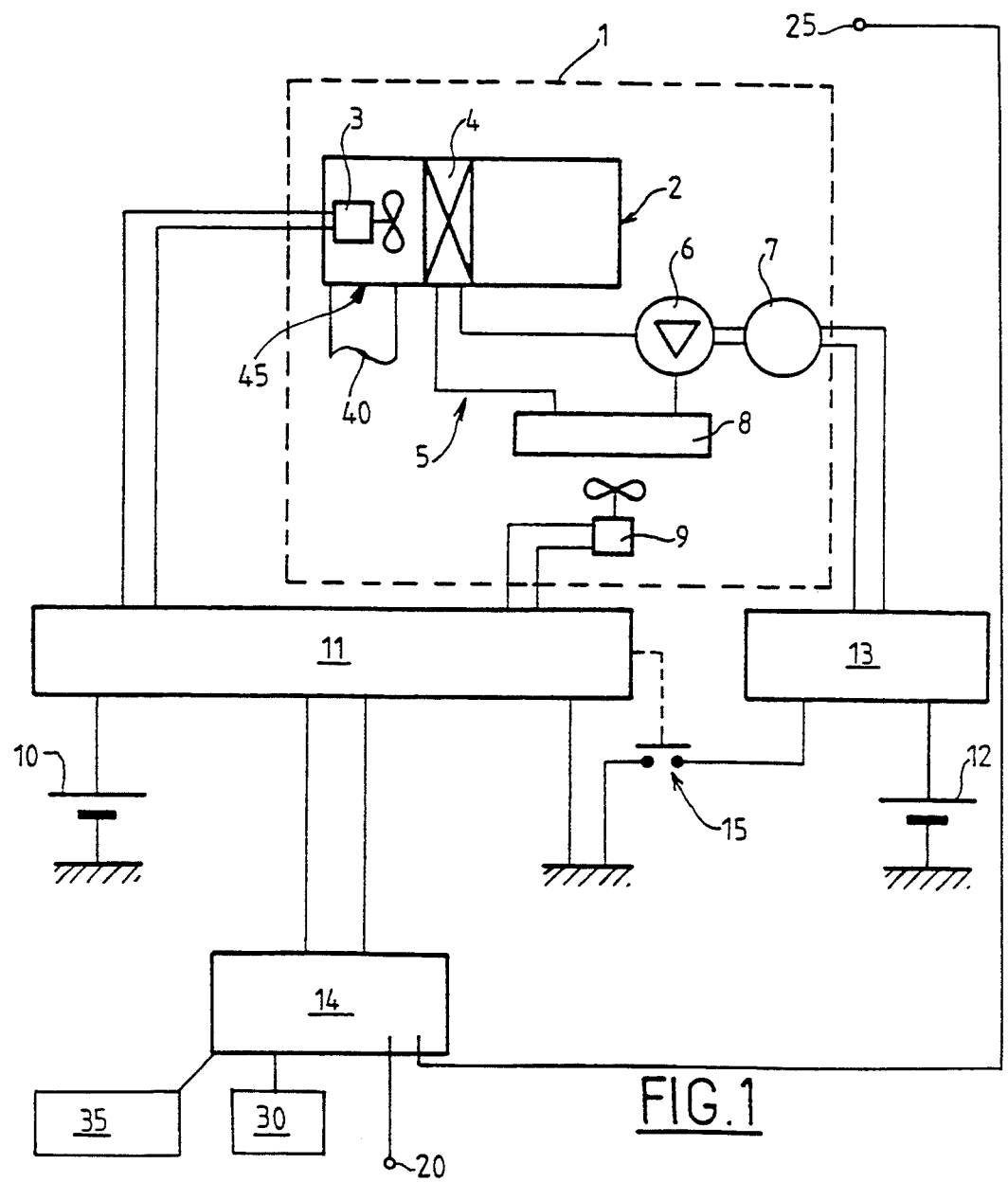
FIG. 1 is a functional diagram of an installation in accordance with the invention.

The installation shown in FIG. 1 consists of equipment which is installed in an electrically propelled vehicle. It comprises an air conditioning apparatus 1, including a unit 2 which defines an air circuit which is not shown in detail. The unit 2 contains, in particular, a motorised fan unit 3 for producing a current of air in the circuit, together with an evaporator 4 which is arranged in the circuit. The evaporator 4 is also part of a refrigerant fluid circuit 5 which also contains, in particular, a compressor 6 which may be driven by an electric motor 7, together with a condenser 8 which is associated with a further motorised fan unit 9.

The motorised fan units 3 and 9 can be supplied with power by an auxiliary 12 volt battery 10, through a low tension power supply circuit 11, and the motor 7 of the compressor can be supplied by the 120 volt traction battery 12, via a high tension power supply circuit 13.

The power supply circuit 11 receives signals from a control unit 14, such as to cause the power supply parameters of the motorised fan unit 3 and compressor motor 7 to vary with time. The control unit 14 may include a remote control receiver 35 which enables the apparatus to be controlled from a distance, and/or programming means such that the apparatus can automatically start to operate at a time set in advance. An internal temperature sensor 25 and an external temperature sensor 20 are also provided, as is a timer 30 useful for interrupting operation of the air conditioning apparatus after a predetermined time.

Operation of the apparatus, which is in response to signals supplied by the control unit 14, will now be explained with reference to FIG. 2. It is first supposed that the temperature $T_i$ of the air in the cabin of the vehicle is 65° C. at the instant $t_o$ in which the process of reducing this temperature is to commence. The control unit compares this internal temperature with the external temperature $T_e$, which is for example 45° C., these two temperatures being represented by the output signals from suitable temperature sensors (not shown).

Figure 2:
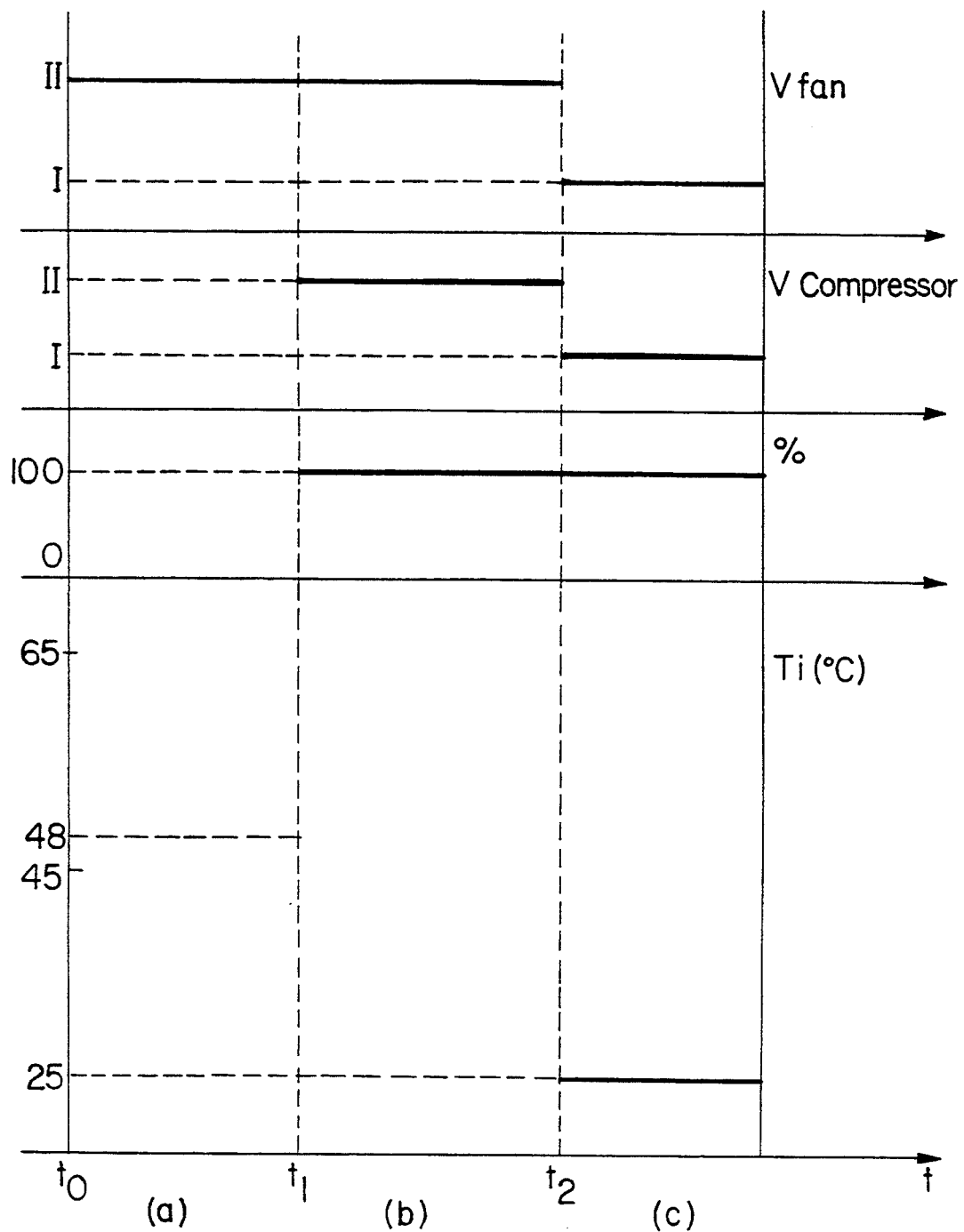
FIG. 2 is a diagram showing the variation with time of certain parameters in the method of the invention.

If the difference $T_i - T_e$ is greater than 3° C., the control unit 14 causes the low tension power supply circuit 11 to operate in such a way that the apparatus as a whole operates in the mode indicated at (a) in FIG. 2. In this mode, the motorised fan unit 3 runs at a relatively high speed which is indicated at II by the first full line at the top of FIG. 2. Also in mode (a), the compressor 6 is not rotating, this being indicated in the second part (V compressor plotted against time) of FIG. 2.

A recirculating valve 45, together with recirculating circuit 40 for the air conditioning unit 2, is controlled, if necessary by the low tension power supply circuit 11, in such a way that the air delivered into the cabin of the vehicle by the motorised fan unit 3 comes exclusively from outside. This is shown in the third part (% air recirculated) of FIG. 2. The internal air at 65° C. is thus replaced by external air at 45° C. This results first of all in a rapid decrease in the temperature $P_i$ (see the curve showing variation of $T_i$ in the bottom part of FIG. 2), and the rate of variation reduces to the extent that $T_i$ approaches $T_e = 45°$ C. At the instant $t_1$ at which the difference $T_i - T_e$ is no more than 3° C., this rate of variation becomes relatively small.

The control unit 14 then changes the operating mode from mode (a) to mode (b), in which the motorised fan unit 3 is supplied with power in the same way as in operating mode (a), while the motor 7 is supplied with power so as to energize it to drive the compressor 6 at the relatively high speed indicated at II in the second part in FIG. 2.

The motor 7 is supplied with power through an interruptor 15 which controls the supply from the high tension power supply circuit 13, and which is itself controlled by the low tension power supply circuit 11. As to the recirculation valve mentioned above, this is moved into a position that corresponds to exclusive admission of recirculated air, that is to say air coming from the interior of the cabin of the vehicle. Thus the air conditioning apparatus operates in such a way as to produce a reduction in the temperature $T_i$ which is as rapid as possible. At the instant $t_2$, the temperature $T_i$ reaches 25° C. The air conditioning apparatus then passes from operating mode (b) to a third operating mode, (c), which corresponds to its normal operation when the vehicle is occupied. The fans and the compressor rotate at reduced speeds as indicated at I in FIG. 2, and the recirculating valve remains so set that 100% of the air flowing in the casing 2 consists of recirculated air. When the occupants enter the vehicle, they find the air in the cabin is at an agreeable temperature.

In addition, if the vehicle is still stationary after a time delay of about 30 minutes, operation of the air conditioning apparatus is stopped.

When the compressor 6 is operating, the motorised fan unit 9 for the condenser 8 is, of course, supplied with power by the low tension power supply circuit 11, in such a way as to evacuate the heat produced by the condenser itself.

The method and apparatus of the invention may also be used in a vehicle having an internal combustion engine, when the vehicle is parked in places where sources of high tension power are not available. The high tension battery 12, which does not exist on board the vehicle itself, is then replaced by suitable connections for connecting the circuit 13 to a source of higher voltage such as the mains or a generator.

What is claimed is:

1. A method of reducing cabin air temperature in a vehicle comprising a cabin, and associated with the cabin an air conditioning means comprising a compressor for a refrigerant fluid, a fan for delivering a stream of air into the cabin and an evaporator for transferring heat from said stream of air to said refrigerant fluid, wherein said method includes the steps of: detecting the temperature of the internal air in the cabin; detecting the temperature of the external air outside the cabin; and controlling the apparatus, in response to said detected temperatures, in three successive stages as follows:

in the first stage, driving the fan so as to deliver external air into the cabin when the internal temperature exceeds the external temperature by at least a predetermined limiting amount;

in the second stage, driving the compressor in a first compressor regime when the condition for the first operating stage is absent but the internal temperature is greater than a predetermined threshold value; and in the third stage, driving the compressor in a second compressor regime such that energy consumption and the heat exchange capacity of the evaporator are reduced as compared with the second stage, when the conditions for the first and second stages are absent, further comprising the step of interrupting the operation of the apparatus when the vehicle remains stationary after a predetermined period of time.

2. A method of reducing cabin air temperature in a vehicle comprising a cabin, and associated with the cabin, an air conditioning means comprising a compressor for a refrigerant fluid, a fan for delivering a stream of air into the cabin and an evaporator for transferring heat from said stream of air to said refrigerant fluid, wherein said method includes the steps of: detecting the temperature of the internal air in the cabin; detecting the temperature of the external air outside the cabin; and controlling the apparatus, in response to said detected temperatures, in three successive stages as follows:

in the first stage, driving the fan so as to deliver external air into the cabin when the internal temperature exceeds the external temperature by at least a predetermined limiting amount;

in the second stage, driving the compressor in a first compressor regime when the condition for the first operating stage is absent but the internal temperature is greater than a predetermined threshold value; and in the third stage, driving the compressor in a second compressor regime such that energy consumption and the heat exchange capacity of the evaporator are reduced as compared with the second stage, when the conditions for the first and second stages are absent, wherein, in said first and second stages, the fan is driven at a first fan speed, and in said third stage it is driven at a second fan speed lower than the first fan speed.

3. An apparatus for installation in a vehicle having a cabin and for reducing the cabin air temperature in said vehicle, the vehicle having air conditioning apparatus comprising a compressor for a refrigerant fluid, a fan for delivering a stream of air into the cabin and an evaporator associated with said compressor for transferring heat from the stream of air to the refrigerant fluid, an internal temperature sensor for detecting the internal temperature of the vehicle, an external temperature sensor for detecting the temperature of air external to the vehicle, and control means connected to the fan, compressor and sensors, so as to control the fan and the compressor in response to signals from the said sensors, the apparatus controlled in subsequent first, second and third stages, the first stage driving the fan so as to deliver external air into the cabin when the internal temperature exceeds the external temperature by at least a predetermined limiting amount; the second stage driving the compressor in a first compressor regime when the condition for the first operating stage is absent but the internal temperature is greater than a predetermined threshold value; and the third stage driving the compressor in a second compressor regime such that energy consumption and the heat exchange capacity of the evaporator are reduced as compared with the second stage, when the conditions for the first and second stages are absent, the apparatus further comprising timing means for automatically interrupting operation of the air conditioning apparatus after a predetermined time.

4. An apparatus for installation in a vehicle having a cabin and for reducing the cabin air temperature in said vehicle, the vehicle having air conditioning apparatus comprising a compressor for a refrigerant fluid, a fan for delivering a stream of air into the cabin and an evaporator associated with said compressor for transferring heat from the stream of air to the refrigerant fluid, an internal temperature sensor for detecting the internal temperature of the vehicle, an external temperature sensor for detecting the temperature of air external to the vehicle, and control means connected to the fan, compressor and sensors, so as to control the fan and the compressor in response to signals from the said sensors, the apparatus controlled in subsequent first, second and third stages, the first stage driving the fan so as to deliver external air into the cabin when the internal temperature exceeds the external temperature by at least a predetermined limiting amount; the second stage driving the compressor in a first compressor regime when the condition for the first operating stage is absent but the internal temperature is greater than a predetermined threshold value; and the third stage driving the compressor in a second compressor regime such that energy consumption and the heat exchange capacity of the evaporator are reduced as compared with the second stage, when the conditions for the first and second stages are absent, the apparatus further comprising programming means for starting the air conditioning apparatus at a predetermined time.

5. An apparatus for installation in a vehicle having a cabin and for reducing the cabin air temperature in said vehicle, the vehicle having air conditioning apparatus comprising a compressor for a refrigerant fluid, a fan for delivering a stream of air into the cabin and an evaporator associated with said compressor for transferring heat from the stream of air to the refrigerant fluid, an internal temperature sensor for detecting the internal temperature of the vehicle, an external temperature sensor for detecting the temperature of air external to the vehicle, and control means connected to the fan, compressor and sensors, so as to control the fan and the compressor in response to signals from the said sensors, the apparatus controlled in subsequent first, second and third stages, the first stage driving the fan so as to deliver external air into the cabin when the internal temperature exceeds the external temperature by at least a predetermined limiting amount; the second stage driving the compressor in a first compressor regime when the condition for the first operating stage is absent but the internal temperature is greater than a predetermined threshold value; and the third stage driving the compressor in a second compressor regime such that energy consumption and the heat exchange capacity of the evaporator are reduced as compared with the second stage, when the conditions for the first and second stages are absent, the apparatus further comprising remote control means for starting the operation of the air condition apparatus from a distance.

6. An apparatus for installation in a vehicle having a cabin and for reducing the cabin air temperature in said vehicle, the vehicle having air conditioning apparatus comprising a compressor for a refrigerant fluid, a fan for delivering a stream of air into the cabin and an evaporator associated with said compressor for transferring heat from the stream of air to the refrigerant fluid, an internal temperature sensor for detecting the internal temperature of the vehicle, an external temperature sensor for detecting the temperature of air external to the vehicle, and control means connected to the fan, compressor and sensors, so as to control the fan and the compressor in response to signals from the said sensors, the apparatus controlled in subsequent first, second and third stages, the first stage driving the fan so as to deliver external air into the cabin when the internal temperature exceeds the external temperature by at least a predetermined limiting amount; the second stage driving the compressor in a first compressor regime when the condition for the first operating stage is absent but the internal temperature is greater than a predetermined threshold value; and the third stage driving the compressor in a second compressor regime such that energy consumption and the heat exchange capacity of the evaporator are reduced as compared with the second stage, when the conditions for the first and second stages are absent, the apparatus further comprising a fan motor coupled with the fan for driving the fan, a compressor motor coupled with the compressor for driving the compressor, low tension power supplying means connected with the fan motor for supplying the fan motor, and high tension supply means connected with the compressor motor for supplying the compressor motor.

7. An apparatus for installation in a vehicle having a cabin and for reducing the cabin air temperature in said vehicle, the vehicle having air conditioning apparatus comprising a compressor for a refrigerant fluid, a fan for delivering a stream of air into the cabin and an evaporator associated with said compressor for transferring heat from the stream of air to the refrigerant fluid, an internal temperature sensor for detecting the internal temperature of the vehicle, an external temperature sensor for detecting the temperature of air external to the vehicle, and control means connected to the fan, compressor and sensors, so as to control the fan and the compressor in response to signals from the said sensors, the apparatus controlled in subsequent first, second and third stages, the first stage driving the fan so as to deliver external air into the cabin when the internal temperature exceeds the external temperature by at least a predetermined limiting amount; the second stage, driving the compressor in a first compressor regime when the condition for the first operating stage is absent but the internal temperature is greater than a predetermined threshold value; and the third stage driving the compressor in a second compressor regime such that energy consumption and the heat exchange capacity of the evaporator are reduced as compared with the second stage, when the conditions for the first and second stages are absent, the apparatus installed in an electrically propelled vehicle having a traction battery, a compressor motor coupled to the compressor for driving the latter, and means connecting the traction battery to the compressor motor whereby to drive the latter.

* * * * *